(12) United States Patent
Thiel

(10) Patent No.: US 8,025,957 B2
(45) Date of Patent: Sep. 27, 2011

(54) VEHICLE TRANSPARENCY

(75) Inventor: James P. Thiel, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 509 days.

(21) Appl. No.: 12/194,731

(22) Filed: Aug. 20, 2008

(65) Prior Publication Data

US 2009/0011205 A1    Jan. 8, 2009

Related U.S. Application Data

(63) Continuation-in-part of application No. 11/746,247, filed on May 9, 2007, now abandoned.

(60) Provisional application No. 60/957,796, filed on Aug. 24, 2007.

(51) Int. Cl.
*B32B 17/06* (2006.01)
*F21V 9/04* (2006.01)

(52) U.S. Cl. ........ 428/216; 428/432; 428/433; 428/434; 428/469; 428/472; 428/699; 428/701; 428/702; 428/913; 359/360; 359/585; 359/589

(58) Field of Classification Search .................. None
See application file for complete search history.

(56) References Cited

U.S. PATENT DOCUMENTS

| | | | |
|---|---|---|---|
| 4,799,745 A | 1/1989 | Meyer et al. | 350/1.7 |
| 5,595,825 A | 1/1997 | Guiselin | 428/428 |
| 6,068,914 A * | 5/2000 | Boire et al. | 428/216 |
| 6,387,515 B1 | 5/2002 | Joret et al. | 428/432 |
| 2002/0120916 A1* | 8/2002 | Snider, Jr. | 717/100 |
| 2002/0136905 A1 | 9/2002 | Medwick et al. | |
| 2004/0009356 A1 | 1/2004 | Medwick et al. | |
| 2004/0028953 A1* | 2/2004 | Kraemling | 428/698 |
| 2005/0155695 A1 | 7/2005 | O'Shaughnessy et al. | |
| 2006/0280951 A1 | 12/2006 | Fleury et al. | |
| 2007/0020465 A1 | 1/2007 | Thiel et al. | |
| 2007/0081227 A1 | 4/2007 | Hartig | |
| 2007/0082219 A1 | 4/2007 | Fleury et al. | |

FOREIGN PATENT DOCUMENTS

WO    WO2007/13405 A2    11/2007

OTHER PUBLICATIONS

International Search Report mailed Nov. 19, 2008, corresponding to International Application No. PCT/US2008073803 filed Aug. 21, 2008.

* cited by examiner

*Primary Examiner* — Ling Xu

(74) *Attorney, Agent, or Firm* — Andrew C. Siminerio

(57) ABSTRACT

A transparency includes a first ply having a first visible light transmission and a second ply having a second visible light transmission, with the first visible light transmission being greater than the second visible light transmission. A solar control coating is located between the first ply and the second ply. The solar control coating has a first infrared reflective metallic layer, a second infrared reflective metallic layer and a third infrared reflective metallic layer. The first infrared reflective metallic layer is thicker than the second infrared reflective metallic layer and the second infrared reflective metallic layer is thicker than the third infrared reflective metallic layer.

12 Claims, 4 Drawing Sheets

VEHICLE TRANSPARENCY

CROSS-REFERENCE TO RELATED APPLICATION

This application is a continuation-in-part of U.S. application Ser. No. 11/746,247 filed May 9, 2007. This application also claims the benefits of U.S. Application Ser. No. 60/957,796 filed Aug. 24, 2007, both of which applications are herein incorporated by reference in their entirety.

BACKGROUND OF THE INVENTION

1. Field of the Invention

This invention relates generally to glazing units and, in one particular embodiment, to an architectural or vehicle transparency having improved solar control performance.

2. Technical Considerations

Vehicle transparencies, such as but not limited to vehicle windows, windshields, rear lights, sunroofs and moonroofs, are designed to allow light to enter the vehicle and also to allow the vehicle occupants to see out of the vehicle. However, one drawback of these vehicle transparencies is that they not only allow light to enter the vehicle but also allow heat to enter the vehicle as well. On warm, sunny days, the vehicle operator may choose to increase the air conditioning of the vehicle to counteract the heat load introduced through the transparencies. This wastes energy and increases fuel consumption.

One solution to this problem has been to use colored or tinted glass to reduce the heat transfer through the transparency. While this does provide some relief, this solution also has some disadvantages. For example, using colored or tinted glass cuts down on the visibility through the transparency. Also, the colored glass absorbs heat more readily than clear glass and can become hot to the touch. Another solution has been to provide solar control coatings on the vehicle transparencies. However, conventional solar control coatings can be expensive to apply and also can limit visibility through the transparencies. This is particularly relevant for vehicle windshields and front windows due to the requirement to meet government imposed limits on minimum visible light transmission through such transparencies.

Therefore, it would be desirable to provide a vehicle that reduces or eliminates at least some of the problems associated with conventional vehicle transparencies.

SUMMARY OF THE INVENTION

A transparency comprises a first ply having a first visible light transmission and a second ply having a second visible light transmission, with the first visible light transmission being greater than the second visible light transmission. A solar control coating is located between the first ply and the second ply. The solar control coating has a first infrared reflective metallic layer, a second infrared reflective metallic layer and a third infrared reflective metallic layer. The first infrared reflective metallic layer is thicker than the second infrared reflective metallic layer and the second infrared reflective metallic layer is thicker than the third infrared reflective metallic layer.

Another transparency comprises a first ply having a No. 1 surface and a No. 2 surface and a second ply secured to the first ply and having a No. 3 surface and a No. 4 surface, with the No. 2 surface of the first ply facing the No. 3 surface of the second ply. The first ply has a visible light transmission greater than the visible light transmission of the second ply. A solar control coating is provided on at least a portion of the No. 2 surface. The solar control coating has a first infrared reflective metallic layer, a second infrared reflective metallic layer and a third infrared reflective metallic layer. The first infrared reflective metallic layer is thicker than the second infrared reflective metallic layer and the second infrared reflective metallic layer is thicker than the third infrared reflective metallic layer.

A vehicle transparency comprises a first glass substrate having a visible light transmission of at least 87%, for example but not limited to at a reference wavelength of 550 nm. A functional coating is provided over at least a portion of the first glass substrate. The functional coating comprises: a zinc stannate layer having a thickness in the range of 250 Å to 310 Å; a zinc oxide layer having a thickness in the range of 80 Å to 105 Å; a first silver layer having a thickness in the range of 90 Å to 205 Å; a zinc oxide layer having a thickness in the range of 80 Å to 110 Å; a zinc stannate layer having a thickness in the range of 585 Å to 680 Å; a zinc oxide layer having a thickness in the range of 80 Å to 110 Å; a second silver layer having a thickness in the range of 100 Å to 140 Å; a zinc oxide layer having a thickness in the range of 80 Å to 100 Å; a zinc stannate layer having a thickness in the range of 530 Å to 565 Å; a zinc oxide layer having a thickness in the range of 80 Å to 105 Å; a third silver layer having a thickness in the range of 80 Å to 120 Å; a zinc oxide layer having a thickness in the range of 80 Å to 105 Å; and a zinc stannate layer having a thickness in the range of 210 Å to 305 Å. The first silver layer is thicker than the second silver layer and the second silver layer is thicker than the third silver layer. The transparency further comprises a second glass substrate having a visible light transmission less than that of the first glass substrate, for example but not limited to at an equivalent thickness and at a reference wavelength of 550 nm.

BRIEF DESCRIPTION OF THE DRAWINGS

The invention will be described with reference to the following drawing figures wherein like reference numbers identify like parts throughout.

DESCRIPTION OF THE PREFERRED EMBODIMENTS

Figure 1:
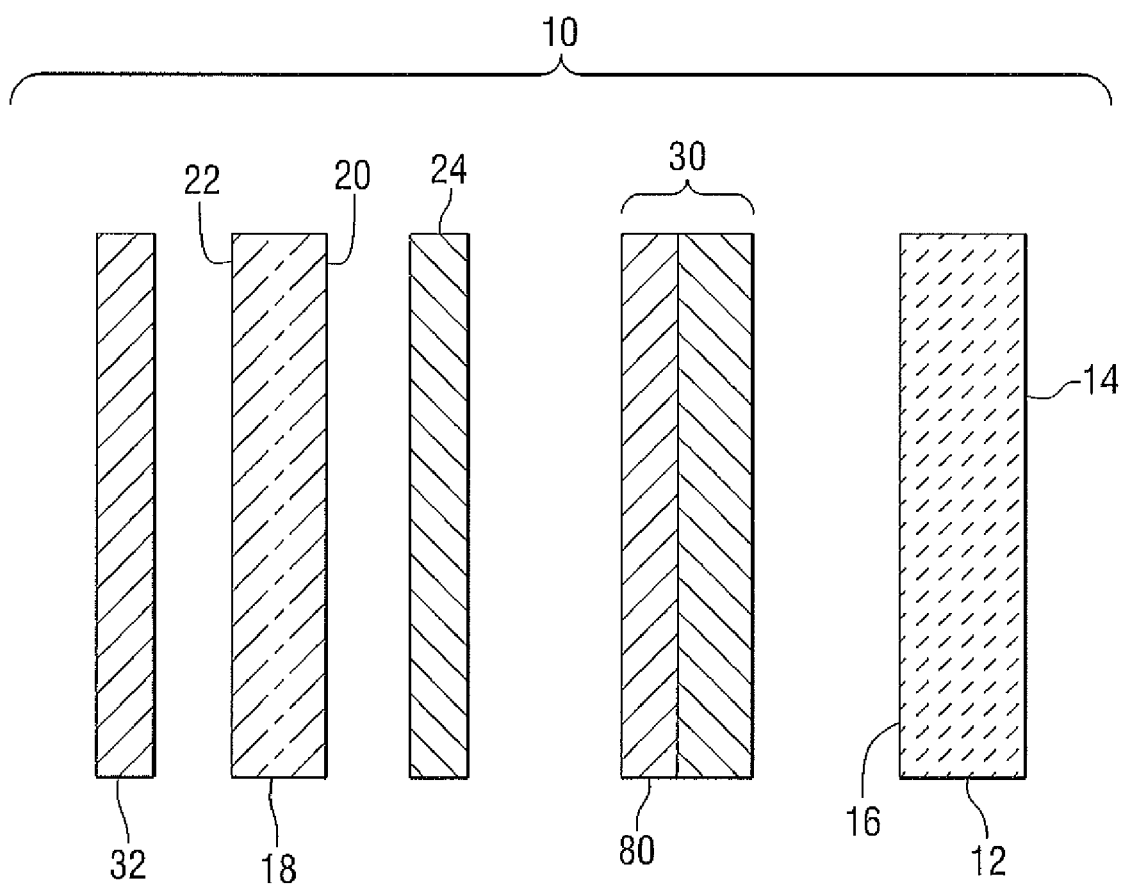
FIG. 1 is an expanded view (not to scale) of a vehicle transparency incorporating features of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. As used herein, the terms "polymer" or "polymeric" include oligomers, homopolymers, copolymers, and terpolymers, e.g., polymers formed from two or more types of monomers or polymers. The terms "visible region" or "visible light" refer to electromagnetic radiation having a wavelength in the range of 380 nm to 800 nm. The terms "infrared region" or "infrared radiation" refer to electromagnetic radiation having a wavelength in the range of greater than 800 nm to 100,000 nm. The terms "ultraviolet region" or "ultraviolet radiation" mean electromagnetic energy having a wavelength in the range of 300 nm to less than 380 nm. Additionally, all documents, such as but not limited to issued patents and patent applications, referred to herein are to be considered to be "incorporated by reference" in their entirety. The "visible transmission" and "dominant wavelength" values are those determined using conventional methods. Those skilled in the art will understand that properties such as visible transmission and dominant wavelength can be calculated at an equivalent standard thickness, e.g., 2.1 mm, even though the actual thickness of a measured glass sample is different than the standard thickness.

For purposes of the following discussion, the invention will be discussed with reference to use with a vehicle transparency. As used herein, the term "vehicle transparency" refers to any transparency located on the vehicle, such as but not limited to windshields, windows, rear lights, sunroofs and moonroofs. However, it is to be understood that the invention is not limited to use with such vehicle transparencies but could be practiced with transparencies in any desired field, such as but not limited to laminated or non-laminated residential and/or commercial windows, insulating glass units, and/or transparencies for land, air, space, above water and under water vehicles. Therefore, it is to be understood that the specifically disclosed exemplary embodiments are presented simply to explain the general concepts of the invention and that the invention is not limited to these specific exemplary embodiments. Additionally, while a typical "transparency" can have sufficient visible light transmission such that materials can be viewed through the transparency, in the practice of the invention the "transparency" need not be transparent to visible light but may be translucent or opaque (as described below). Non-limiting examples of vehicle transparencies and methods of making the same are found in U.S. Pat. Nos. 4,820,902; 5,028,759; and 5,653,903.

A non-limiting transparency 10 incorporating features of the invention is illustrated in FIG. 1. The transparency 10 can have any desired visible light, infrared radiation, or ultraviolet radiation transmission and reflection. For example, the transparency 10 can have a visible light transmission of any desired amount, e.g., greater than 0% to 100%. In one non-limiting embodiment, the visible light transmission at a reference wavelength of 550 nm can be greater than 50%, such as greater than 60%, such as greater than 70%, such as greater than 80%, such as greater than 90%.

As best seen in FIG. 1, the transparency 10 includes a first ply 12 with a first major surface 14 (No. 1 surface) and an opposed second major surface 16 (No. 2 surface). In the illustrated non-limiting embodiment, the first major surface 14 faces the vehicle exterior, i.e., is an outer major surface, and the second major surface 16 faces the interior of the vehicle. The transparency 10 also includes a second ply 18 having an outer (first) major surface 20 (No. 3 surface) and an inner (second) major surface 22 (No. 4 surface). This numbering of the ply surfaces is in keeping with conventional practice in the automotive art. The first and second plies 12, 18 can be bonded together in any suitable manner, such as by a conventional interlayer 24 formed by a polymeric layer or an adhesive. A solar control coating 30 is formed over at least a portion of one of the plies 12, 18, such as but not limited to over the No. 2 surface 16 or No. 3 surface 20. Although not required, in one non-limiting embodiment, an antireflective coating 32 can be formed over at least one of the surfaces, such as but not limited to over the No. 4 surface 22.

In the broad practice of the invention, the plies 12, 18 of the transparency 10 can be of the same or different materials. The plies 12, 18 can include any desired material having any desired characteristics. For example, one or more of the plies 12, 18 can be transparent or translucent to visible light. By "transparent" is meant having visible light transmission of greater than 0% to 100%. Alternatively, one or more of the plies 12, 18 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the plies 12, 18 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. The ribbon is then cut and/or shaped and/or heat treated as desired. Examples of float glass processes are disclosed in U.S. Pat. Nos. 4,466,562 and 4,671,155. The first and second plies 12, 18 can each be, for example, clear float glass or can be tinted or colored glass or one ply 12, 18 can be clear glass and the other ply 12, 18 colored glass. Although not limiting to the invention, examples of glass suitable for the first ply 12 and/or second ply 18 are described in U.S. Pat. Nos. 4,746,347; 4,792,536; 5,030,593; 5,030,594; 5,240,886; 5,385,872; and 5,393,593. The first and second plies 12, 18 can be of any desired dimensions, e.g., length, width, shape, or thickness. In one exemplary automotive transparency, the first and second plies can each be 1 mm to 10 mm thick, e.g., 1 mm to 5 mm thick (e.g., less than 3 mm thick), or 1.5 mm to 2.5 mm, or 1.8 mm to 2.3 mm, e.g., 2.1 mm thick.

In one non-limiting embodiment, one or both of the plies 12, 18 can have a high visible light transmission at a reference wavelength of 550 nanometers (nm) and a reference thickness of 2.1 mm. By "high visible light transmission" is meant visible light transmission at 550 nm of greater than or equal to 85%, such as greater than or equal to 87%, such as greater than or equal to 90%, such as greater than or equal to 91%, such as greater than or equal to 92%. Particularly useful glass for the practice of the invention is disclosed in U.S. Pat. Nos. 5,030,593 and 5,030,594 and is commercially available from PPG Industries, Inc. under the mark Starphire®.

In one particular non-limiting embodiment, the first ply 12 comprises a material having a higher visible light transmission than the second ply 18. For example, in one non-limiting embodiment, the first ply 12 comprises a high visible light transmission glass of the type described above and the second ply 18 comprises clear glass or colored glass, which can have a lower visible light transmission than the first ply 12 at an equivalent thickness. For example and without limiting the present invention, the first ply 12 can have a visible light transmission greater than or equal to 87%, such as greater than or equal to 90%, such as greater than or equal to 91%, such as greater than or equal to 92%. A suitable glass for the first ply is Starphire® glass commercially available from PPG Industries.

The second ply 18 can have a visible light transmission the same or similar to that of the first ply 12 or, alternatively, less than that of the first ply 12, such as up to 90%, such as up to 85%, such as up to 80%, such as up to 70%, such as up to 60%, such as up to 50%, such as up to 30%, such as up to 20%. Non-limiting examples of glass that can be used for the practice of the invention include Starphire®, Solargreen®, Solextra®, GL-20®, GL-35™, Solarbronze®, and Solargray® glass, all commercially available from PPG Industries Inc. of Pittsburgh, Pa. In one particular non-limiting embodiment, the first ply 12 comprises Starphire® glass (commercially available from PPG Industries, Inc.) having a thickness in the range of 1.7 mm to 2.5 mm, e.g., 2.1 mm to 2.3 mm, and the second ply comprises clear glass, e.g., GL20® glass (commercially available from PPG Industries, Inc.) having a thickness in the range of 1.7 mm to 2.5 mm, e.g., 2.0 mm to 2.3 mm. In a further non-limiting embodiment, one or both of the plies 12, 18 can be annealed glass.

The interlayer 24 can be of any desired material and can include one or more layers or plies. The interlayer 24 can be a polymeric or plastic material, such as, for example, polyvinylbutyral, plasticized polyvinyl chloride, or multi-layered thermoplastic materials including polyethyleneterephthalate, etc. Suitable interlayer materials are disclosed, for example but not to be considered as limiting, in U.S. Pat. Nos. 4,287,107 and 3,762,988. The interlayer 24 secures the first and second plies 12, 18 together, and can provide energy absorption, reduce noise, and increase the strength of the laminated structure. The interlayer 24 can also be a sound-absorbing or attenuating material as described, for example, in U.S. Pat. No. 5,796,055. The interlayer 24 can have a solar control coating provided thereon or incorporated therein or can include a colored material to reduce solar energy transmission and/or to provide a color to the transparency 10. In one non-limiting embodiment, the interlayer 24 is polyvinylbutyral and has a thickness in the range of 0.5 mm to 1.5 mm, such as 0.75 mm to 0.8 mm.

In another non-limiting embodiment, the interlayer 24 securing the plies 12, 18 together is a conventional optical adhesive. As will be appreciated by one skilled in the art, an optical adhesive layer is typically much thinner than a conventional PVB layer. An example of an optical adhesion useful for the invention is Norland Optical Adhesive (No. 61, UV curing) commercially available from Norland Products, Inc. of Cranbury, N.J.

The solar control coating 30 is deposited over at least a portion of a major surface of one of the glass plies 12, 18, such as but not limited to the inner surface 16 of the outboard glass ply 12 (FIG. 1) or the outer surface 20 of the inner glass ply 18. As used herein, the term "solar control coating" refers to a coating comprised of one or more layers or films that affect the solar properties of the coated article, such as but not limited to the amount of solar radiation, for example, visible, infrared, or ultraviolet radiation, reflected from, absorbed by, or passing through the coated article; shading coefficient; emissivity, etc. The solar control coating can block, absorb or filter selected portions of the solar spectrum, such as but not limited to the IR, UV, and/or visible spectrums. Examples of solar control coatings are found, for example but not to be considered as limiting, in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,759, and also in U.S. patent application Ser. No. 09/058,440. Examples of solar control coatings are commercially available from PPG Industries, Inc. of Pittsburgh, Pa. under the SUNGATE® and SOLARBAN® families of coatings.

In one non-limiting embodiment, the solar control coating 30 includes one or more infrared reflective metallic films positioned between pairs of dielectric layers applied sequentially over at least a portion of one of the glass plies 12, 18. The solar control coating 30 can be a heat and/or radiation reflecting coating and can have one or more coating layers or films of the same or different composition and/or functionality. As used herein, the term "film" refers to a coating region of a desired or selected coating composition. A "layer" can comprise one or more "films" and a "coating" or "coating stack" can comprise one or more "layers". For example, the solar control coating 30 can be a single layer coating or a multi-layer coating and can include one or more metals, non-metals, semi-metals, semiconductors, and/or alloys, compounds, compositions, combinations, or blends thereof. For example, the solar control coating 30 can be a single layer metal oxide coating, a multiple layer metal oxide coating, a non-metal oxide coating, a metallic nitride or oxynitride coating, a non-metallic nitride or oxynitride coating, or a multiple layer coating comprising one or more of any of the above materials. In one non-limiting embodiment, the solar control coating 30 can be a doped metal oxide coating.

The solar control 30 can be a functional coating. As used herein, the term "functional coating" refers to a coating that modifies one or more physical properties of the substrate over which it is deposited, e.g., optical, thermal, chemical or mechanical properties, and is not intended to be entirely removed from the substrate during subsequent processing.

The solar control coating 30 can have one or more functional coating layers or films of the same or different composition or functionality.

The solar control coating 30 can also be an electroconductive low emissivity coating that allows visible wavelength energy to be transmitted through the coating but reflects longer wavelength solar infrared energy. By "low emissivity" is meant emissivity less than 0.4, such as less than 0.3, such as less than 0.2, such as less than 0.1, e.g., less than or equal to 0.05. Examples of low emissivity coatings are found, for example, in U.S. Pat. Nos. 4,952,423 and 4,504,109 and British reference GB 2,302,102.

The coating 30 includes one or more antireflective coating films comprising dielectric or anti-reflective materials, such as metal oxides or oxides of metal alloys, which are transparent to visible light. The coating 30 also includes one or more infrared reflective metallic films comprising a reflective metal, e.g., a noble metal such as gold, copper or silver, or combinations or alloys thereof, and can further comprise a primer film or barrier film, such as titanium, as is known in the art, located over and/or under the metal reflective layer. The coating 30 can have any desired number of infrared reflective films, such as but not limited to 1 to 5 infrared reflective films. In one non-limiting embodiment, the coating 30 can have 1 or more silver layers, e.g., 2 or more silver layers, e.g., 3 or more silver layers, such as 5 or more silver layers. A non-limiting example of a coating having three silver layers is disclosed in U.S. patent application Ser. No. 10/364,089 (Publication No. 2003/0180547 A1).

The coating 30 can be deposited by any conventional method, such as but not limited to conventional chemical vapor deposition (CVD) and/or physical vapor deposition (PVD) methods. Examples of CVD processes include spray pyrolysis. Examples of PVD processes include electron beam evaporation and vacuum sputtering (such as magnetron sputter vapor deposition (MSVD)). Other coating methods could also be used, such as but not limited to sol-gel deposition. In one non-limiting embodiment, the coating 30 can be deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750.

Figure 2:
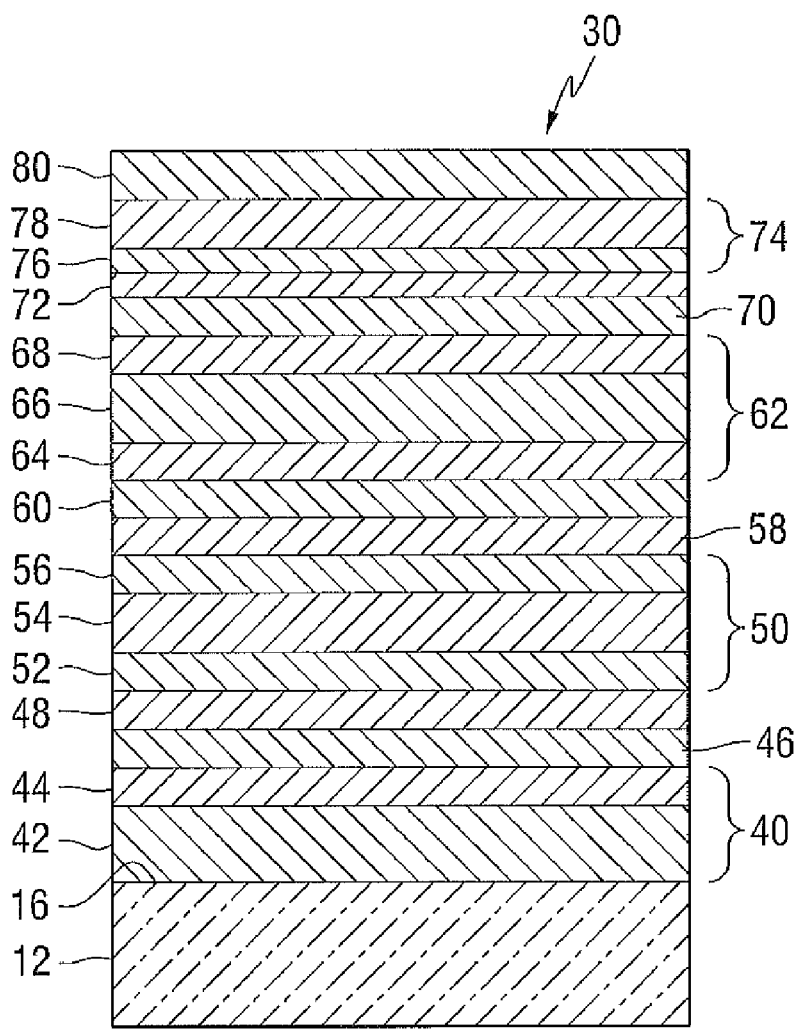
FIG. 2 is a cross-sectional view (not to scale) of a solar control coating of the invention.

An exemplary non-limiting coating 30 suitable for the invention is shown in FIG. 2. This exemplary coating 30 includes a base layer or first dielectric layer 40 deposited over at least a portion of a major surface of a substrate (e.g., the No. 2 surface 16 of the first ply 12). The first dielectric layer 40 can comprise one or more films of antireflective materials and/or dielectric materials, such as but not limited to metal oxides, oxides of metal alloys, nitrides, oxynitrides, or mixtures thereof. The first dielectric layer 40 can be transparent to visible light. Examples of suitable metal oxides for the first dielectric layer 40 include oxides of titanium, hafnium, zirconium, niobium, zinc, bismuth, lead, indium, tin, and mixtures thereof. These metal oxides can have small amounts of other materials, such as manganese in bismuth oxide, tin in indium oxide, etc. Additionally, oxides of metal alloys or metal mixtures can be used, such as oxides containing zinc and tin (e.g., zinc stannate), oxides of indium-tin alloys, silicon nitrides, silicon aluminum nitrides, or aluminum nitrides. Further, doped metal oxides, such as antimony or indium doped tin oxides or nickel or boron doped silicon oxides, can be used. The first dielectric layer 40 can be a substantially single phase film, such as a metal alloy oxide film, e.g., zinc stannate, or can be a mixture of phases composed of zinc and tin oxides or can be composed of a plurality of films, such as but not limited to those disclosed in U.S. Pat. Nos. 5,821,001; 4,898,789; and 4,898,790.

In the illustrated exemplary embodiment shown in FIG. 2, the first dielectric layer 40 can comprise a multi-film structure having a first film 42, e.g., a metal alloy oxide film, deposited over at least a portion of the inner major surface 16 of the first ply 12 and a second film 44, e.g., a metal oxide or oxide mixture film, deposited over the first metal alloy oxide film 42. In one non-limiting embodiment, the first film 42 can be a zinc/tin alloy oxide. By "zinc/tin alloy oxide" is meant both true alloys and also mixtures of the oxides. The zinc/tin alloy oxide can be that obtained from magnetron sputtering vacuum deposition from a cathode of zinc and tin. One non-limiting cathode can comprise zinc and tin in proportions of 5 wt. % to 95 wt. % zinc and 95 wt. % to 5 wt. % tin, such as 10 wt. % to 90 wt. % zinc and 90 wt. % to 10 wt. % tin. However, other ratios of zinc to tin could also be used. One suitable metal alloy oxide that can be present in the first film 42 is zinc stannate. By "zinc stannate" is meant a composition of $Zn_xSn_{1-x}O_{2-x}$ (Formula 1) where "x" varies in the range of greater than 0 to less than 1. For instance, "x" can be greater than 0 and can be any fraction or decimal between greater than 0 to less than 1. For example where x=⅔, Formula 1 is $Zn_{2/3}Sn_{1/3}O_{4/3}$, which is more commonly described as "$Zn_2SnO_4$". A zinc stannate-containing film has one or more of the forms of Formula 1 in a predominant amount in the film. The second film 44 can be a zinc-containing film, such as zinc oxide. The zinc oxide film can be deposited from a zinc cathode that includes other materials to improve the sputtering characteristics of the cathode. For example, the zinc cathode can include a small amount (e.g., 10 wt. % or less, such as 0 wt. % to 5 wt. %) of tin to improve sputtering. In which case, the resultant zinc oxide film would include a small percentage of tin oxide, e.g., 0 to less than 10 wt. % tin oxide, e.g., 0 to 5 wt. % tin oxide. An oxide layer sputtered from a zinc/tin cathode having ninety-five percent zinc and five percent tin is written as $Zn_{0.95}Sn_{0.05}O_{1.05}$ herein; similarly, a zinc/tin cathode having 10 wt. % tin would be $Zn_{0.90}Sn_{0.15}O_{1.05}$. A coating layer deposited from a zinc cathode having 10 wt. % or less tin (added to enhance the conductivity of the cathode) is referred to herein as "a zinc oxide film" even though a small amount of the tin may be present. The small amount of tin in the cathode (e.g., less than or equal to 10 wt. %, such as less than or equal to 5 wt. %) is believed to form a small amount of tin oxide in the predominantly zinc oxide-containing second film 44.

In one non-limiting embodiment, the first film 42 is zinc stannate and the second film 44 is zinc oxide. The first dielectric layer 40 has a total thickness of less than or equal to 1,000 Å, such as less than or equal to 600 Å, e.g., 300 Å to 500 Å, e.g., 350 Å to 450 Å, e.g., 380 Å to 410 Å. In one particular embodiment, the first film 42 comprising zinc stannate has a thickness in the range of 100 Å to 600 Å, such as 200 Å to 500 Å, such as 250 Å to 350 Å, such as 250 Å to 310 Å, such as 280 Å to 310 Å, such as 300 Å to 310 Å.

The second film 44 comprising zinc oxide can have a thickness in the range of 10 Å to 200 Å, such as 50 Å to 200 Å, such as 75 Å to 150 Å, such as 80 Å to 105 Å, such as 80 Å to 100 Å.

A first heat and/or radiation reflective metallic layer 46 can be deposited over the first dielectric layer 40. The first reflective layer 46 can include a reflective metal, such as but not limited to metallic gold, copper, silver, or mixtures, alloys, or combinations thereof. In one embodiment, the first reflective layer 46 comprises a metallic silver layer having a thickness in the range of 25 Å to 300 Å, e.g., 50 Å to 300 Å, e.g., 50 Å to 250 Å, e.g., 50 Å to 205 Å, such as 90 Å to 205 Å, such as 70 Å to 150 Å, such as 80 Å to 150 Å, such as 90 Å to 140 Å, such as 95 Å to 135 Å.

A first primer film 48 can be deposited over the first reflective layer 46. The first primer film 48 can be an oxygen-capturing material, such as titanium, that can be sacrificial during the deposition process to prevent degradation or oxidation of the first reflective layer 46 during the sputtering process or subsequent heating processes. The oxygen-capturing material can be chosen to oxidize before the material of the first reflective layer 46. If titanium is used as the first primer film 48, the titanium would preferentially oxidize to titanium dioxide during subsequent processing of the coating before oxidation of the underlying silver layer. In one embodiment, the first primer film 48 is titanium having a thickness in the range of 5 Å to 50 Å, e.g., 10 Å to 40 Å, e.g., 13 Å to 25 Å, e.g., 13 Å to 20 Å.

An optional second dielectric layer 50 can be deposited over the first reflective layer 46 (e.g., over the first primer film 48). The second dielectric layer 50 can comprise one or more metal oxide or metal alloy oxide-containing films, such as those described above with respect to the first dielectric layer. In the illustrated non-limiting embodiment, the second dielectric layer 50 includes a first metal oxide film 52, e.g., a zinc oxide film deposited over the first primer film 48. A second metal alloy oxide film 54, e.g., a zinc stannate ($Zn_2SnO_4$) film, can be deposited over the first zinc oxide film 52. A third metal oxide film 56, e.g., another zinc oxide layer, can be deposited over the zinc stannate layer to form a multi-film second dielectric layer 50. In one non-limiting embodiment, one or both of the zinc oxide films 52, 56 of the second dielectric layer 50 can have a thickness in the range of 50 Å to 200 Å, e.g., 60 Å to 150 Å, e.g., 80 Å to 110 Å. The metal alloy oxide layer (zinc stannate) 54 can have a thickness in the range of 100 Å to 800 Å, e.g., 200 Å to 700 Å, e.g., 300 Å to 700 Å, e.g., 300 Å to 680 Å, e.g., 550 Å to 680 Å, e.g., 585 Å to 680 Å, e.g., 550 Å to 620 Å, e.g., 585 Å to 620 Å.

In one non-limiting embodiment, the total thickness of the second dielectric layer 50 (e.g., the combined thicknesses of the zinc oxide and zinc stannate layers) is in the range of 200 Å to 1000 Å, e.g., 400 Å to 1000 Å, e.g., 300 Å to 900 Å, e.g., 600 Å to 900 Å, e.g., 700 Å to 850 Å.

An optional second heat and/or radiation reflective layer 58 can be deposited over the second dielectric layer 50. The second reflective layer 58 can include any one or more of the reflective materials described above with respect to the first reflective layer 46. In one non-limiting embodiment, the second reflective layer 58 comprises silver having a thickness in the range of 25 Å to 200 Å, e.g., 50 Å to 150 Å, e.g., 80 Å to 150 Å, e.g., 100 Å to 150 Å, e.g., 100 Å to 140 Å, e.g., 100 Å to 130 Å. In one non-limiting embodiment, this second reflective layer 58 can be thinner than the first reflective layer.

An optional second primer film 60 can be deposited over the second reflective layer 58. The second primer film 60 can be any of the materials described above with respect to the first primer film 48. In one non-limiting embodiment, the second primer film includes titanium having a thickness in the range of about 5 Å to 50 Å, e.g., 10 Å to 25 Å, e.g., 13 Å to 25 Å, e.g., 13 Å to 20 Å.

An optional third dielectric layer 62 can be deposited over the second reflective layer 58 (e.g., over the second primer film 60). The third dielectric layer 62 can also include one or more metal oxide or metal alloy oxide-containing layers, such as discussed above with respect to the first and second dielectric layers 40, 50. In one non-limiting embodiment, the third dielectric layer 62 is a multi-film layer similar to the second dielectric layer 50. For example, the third dielectric layer 62 can include a first metal oxide layer 64, e.g., a zinc oxide layer, a second metal alloy oxide-containing layer 66, e.g., a zinc stannate layer ($Zn_2SnO_4$), deposited over the zinc oxide layer 64, and a third metal oxide layer 68, e.g., another zinc oxide layer, deposited over the zinc stannate layer 66. In one non-limiting embodiment, one or both of the zinc oxide layers 64, 68 can have thicknesses in the range of 50 Å to 200 Å, such as 75 Å to 150 Å, such as 80 Å to 100 Å. The metal alloy oxide layer 66 can have a thickness in the range of 100 Å to 800 Å, e.g., 200 Å to 700 Å, e.g., 300 Å to 600 Å, e.g., 500 Å to 600 Å, e.g., 520 Å to 580 Å, e.g., 540 Å to 560 Å, e.g., 530 Å to 565 Å.

In one non-limiting embodiment, the total thickness of the third dielectric layer 62 (e.g., the combined thicknesses of the zinc oxide and zinc stannate layers) is in the range of 200 Å to 1000 Å, e.g., 400 Å to 900 Å, e.g., 500 Å to 900 Å, e.g., 600 Å to 900 Å, e.g., 700 Å to 900 Å.

In one non-limiting embodiment of the invention, the second dielectric layer 50 and third dielectric layer 62 have thicknesses that are within 10% of each other, such as within 5%, such as within 3% of each other, such as within 2% of each other.

The coating 30 can further include an optional third heat and/or radiation reflective layer 70 deposited over the third dielectric layer 62. The third reflective layer 70 can be of any of the materials discussed above with respect to the first and second reflective layers. In one non-limiting embodiment, the third reflective layer 70 includes silver and has a thickness in the range of 25 Å to 300 Å, e.g., 50 Å to 300 Å, e.g., 50 Å to 200 Å, such as 70 Å to 150 Å, such as 80 Å to 150 Å, such as 80 Å to 120 Å. In one non-limiting embodiment, the first reflective layer 46 is thicker than the second reflective layer 58 which is thicker than the third reflective layer 70. Thus, in one non-limiting embodiment, when the transparency 10 is installed in a vehicle with the first surface 14 facing the exterior and the fourth surface 22 facing the vehicle interior, the outermost infrared reflective metallic layer 46 is thicker than the middle infrared reflective metallic layer 58 which is in turn thicker than the innermost infrared reflective metallic layer 70.

An optional third primer film 72 can be deposited over the third reflective layer 70. The third primer film 72 can be of any of the primer materials described above with respect to the first or second primer films. In one non-limiting embodiment, the third primer film is titanium and has a thickness in the range of 5 Å to 50 Å, e.g., 10 Å to 25 Å, e.g., 13 Å to 20 Å.

An optional fourth dielectric layer 74 can be deposited over the third reflective layer (e.g., over the third primer film 72). The fourth dielectric layer 74 can be comprised of one or more metal oxide or metal alloy oxide-containing layers, such as those discussed above with respect to the first, second, or third dielectric layers 40, 50, 62. In one non-limiting embodiment, the fourth dielectric layer 74 is a multi-film layer having a first metal oxide layer 76, e.g., a zinc oxide layer, deposited over the third primer film 72, and a second metal alloy oxide layer 78, e.g., a zinc stannate layer ($Zn_2SnO_4$), deposited over the zinc oxide layer 76. In one non-limiting embodiment, the zinc oxide layer 76 can have a thickness in the range of 25 Å to 200 Å, such as 50 Å to 150 Å, such as 60 Å to 120 Å, such as 80 Å to 105 Å. The zinc stannate layer 78 can have a thickness in the range of 25 Å to 500 Å, e.g., 50 Å to 500 Å, e.g., 100 Å to 400 Å, e.g., 200 Å to 350 Å, e.g., 200 Å to 320 Å, e.g., 210 Å to 320 Å, e.g., 210 Å to 305 Å.

In one non-limiting embodiment, the total thickness of the fourth dielectric layer 74 (e.g., the combined thicknesses of the zinc oxide and zinc stannate layers) is in the range of 100 Å to 800 Å, e.g., 200 Å to 600 Å, e.g., 250 Å to 500 Å, e.g., 250 Å to 410 Å.

The coating 30 can contain additional groups of dielectric layer/reflective metal layer/primer layer units if desired. In one non-limiting embodiment, the coating 30 can contain five or more infrared reflective metal layers, e.g., up to five silver layers.

The coating 30 can include a protective overcoat 80, which, for example in the non-limiting embodiment shown in FIG. 2, is deposited over the optional fourth dielectric layer 74 (if present), to assist in protecting the underlying layers, such as the antireflective layers, from mechanical and chemical attack during processing. The protective coating 80 can be an oxygen barrier coating layer to prevent or reduce the passage of ambient oxygen into the underlying layers of the coating 30 during subsequent processing, e.g., such as during heating or bending. The protective coating 80 can be of any desired material or mixture of materials. In one exemplary embodiment, the protective overcoat 80 comprises one or more metal or metal oxide layers. For example, in one non-limiting embodiment the protective overcoat 80 comprises a metal layer, such as titanium, having a thickness in the range of 10 Å to 100 Å, such as 10 Å to 80 Å, such as 20 Å to 50 Å, such as 35 Å to 45 Å. This metal layer may be oxidized upon processing of the article to convert the metal, e.g., titanium, to a metal oxide, e.g., titania.

In another non-limiting embodiment, the protective coating 80 can include a layer having one or more metal oxide materials, such as but not limited to oxides of aluminum, silicon, titanium or mixtures thereof. For example, the protective coating 80 can be a single coating layer comprising in the range of 0 wt. % to 100 wt. % alumina and/or 100 wt. % to 0 wt. % silica, such as 1 wt. % to 99 wt. % alumina and 99 wt. % to 1 wt. % silica, such as 5 wt. % to 95 wt. % alumina and 95 wt. % to 5 wt. % silica, such as 10 wt. % to 90 wt. % alumina and 90 wt. % to 10 wt. % silica, such as 15 wt. % to 90 wt. % alumina and 85 wt. % to 10 wt. % silica, such as 50 wt. % to 75 wt. % alumina and 50 wt. % to 25 wt. % silica, such as 50 wt. % to 70 wt. % alumina and 50 wt. % to 30 wt. % silica, such as 35 wt. % to 100 wt. % alumina and 65 wt. % to 0 wt. % silica, e.g., 70 wt. % to 90 wt. % alumina and 30 wt. % to 10 wt. % silica, e.g., 75 wt. % to 85 wt. % alumina and 25 wt. % to 15 wt. % of silica, e.g., 88 wt. % alumina and 12 wt. % silica, e.g., 65 wt. % to 75 wt. % alumina and 35 wt. % to 25 wt. % silica, e.g., 70 wt. % alumina and 30 wt. % silica, e.g., 60 wt. % to less than 75 wt. % alumina and greater than 25 wt. % to 40 wt. % silica. In one particular non-limiting embodiment, the protective overcoat 80 comprises 40 wt. % to 60 wt. % alumina and 60 wt. % to 40 wt. % silica. In another non-limiting embodiment, the protective overcoat 80 can comprise 85 wt. % silica and 15 wt. % alumina and, can have a thickness in the range of 100 Å to 5000 Å, such as 500 Å to 2000 Å, such as 500 Å to 1500 Å. Other materials, such as aluminum, chromium, hafnium, yttrium, nickel, boron, phosphorous, titanium, zirconium, and/or oxides thereof, can also be present, such as to adjust the refractive index of the protective coating 80. In one non-limiting embodiment, the refractive index of the protective coating 80 can be in the range of 1 to 3, such as 1 to 2, such as 1.4 to 2, such as 1.4 to 1.8.

In one non-limiting embodiment, the protective coating 80 is a combination silica and alumina coating. The protective coating 80 can be sputtered from two cathodes (e.g., one silicon and one aluminum) or from a single cathode containing both silicon and aluminum. This silicon/aluminum oxide protective coating 80 can be written as $Si_xAl_{1-x}O_{1.5+x/2}$, where x can vary from greater than 0 to less than 1.

Alternatively, the protective coating 80 can be a multi-layer coating formed by separately formed layers of metal oxide materials, such as but not limited to a bilayer formed by one metal oxide-containing layer (e.g., a silica and/or alumina-containing first layer) formed over another metal oxide-containing layer (e.g., a silica and/or alumina-containing second layer). The individual layers of the multi-layer protective coating can be of any desired thickness.

The protective coating can be of any desired thickness. In one non-limiting embodiment, the protective coating 80 is a silicon/aluminum oxide coating ($Si_xAl_{1-x}O_{1.5+x/2}$) having a thickness in the range of 50 Å to 50,000 Å, such as 50 Å to 10,000 Å, such as 100 Å to 1,000 Å, e.g., 100 Å to 500 Å, such as 100 Å to 400 Å, such as 200 Å to 300 Å, such as 250 Å. Further, the protective coating 80 can be of non-uniform thickness. By "non-uniform thickness" is meant that the thickness of the protective coating 80 can vary over a given unit area, e.g., the protective coating 80 can have high and low spots or areas.

In another non-limiting embodiment, the protective coating 80 can comprise a first layer and a second layer formed over the first layer. In one specific non-limiting embodiment, the first layer can comprise alumina or a mixture or alloy comprising alumina and silica. For example, the first layer can comprise alumina or a silica/alumina mixture having greater than 5 wt. % alumina, such as greater than 10 wt. % alumina, such as greater than 15 wt. % alumina, such as greater than 30 wt. % alumina, such as greater than 40 wt. % alumina, such as 50 wt. % to 70 wt. % alumina, such as in the range of 70 wt. % to 100 wt. % alumina and 30 wt. % to 0 wt. % silica, such as greater than 90 wt. % alumina, such as greater than 95 wt. % alumina. In one non-limiting embodiment, the first layer comprises all or substantially all alumina. In one non-limiting embodiment, the first layer can have a thickness in the range of greater than 0 Å to 1 micron, such as 50 Å to 100 Å, such as 100 Å to 250 Å, such as 100 Å to 150 Å. The second layer can comprise silica or a mixture or alloy comprising silica and alumina. For example, the second layer can comprise a silica/alumina mixture having greater than 40 wt. % silica, such as greater than 50 wt. % silica, such as greater than 60 wt. % silica, such as greater than 70 wt. % silica, such as greater than 80 wt. % silica, such as in the range of 80 wt. % to 90 wt. % silica and 10 wt. % to 20 wt. % alumina, e.g., 85 wt. % silica and 15 wt. % alumina. In one non-limiting embodiment, the second layer can have a thickness in the range of greater than 0 Å to 2 microns, such as 50 Å to 5,000 Å, such as 50 Å to 2,000 Å, such as 100 Å to 1,000 Å, such as 300 Å to 500 Å, such as 350 Å to 400 Å. Non-limiting examples of suitable protective coatings are described, for example, in U.S. patent application Ser. Nos. 10/007,382; 10/133,805; 10/397,001; 10/422,094; 10/422,095; and 10/422,096.

Figure 3:
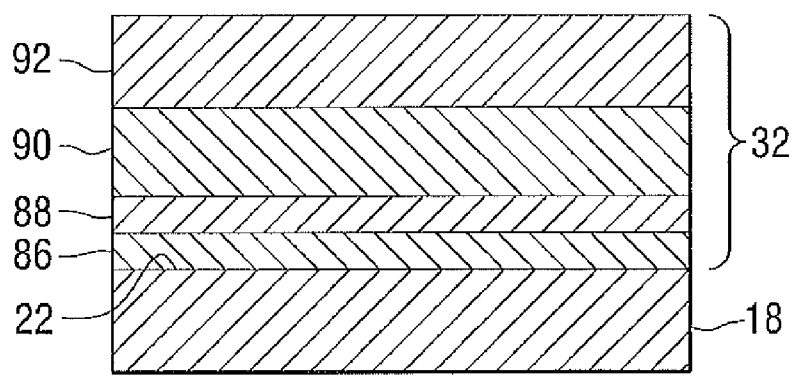
FIG. 3 is a cross-sectional view (not to scale) of an antireflective coating useful for the invention.

Although not required, the transparency 10 can further include an antireflective coating 32, for example on the No. 4 surface 22 of the second ply 18. In one non-limiting embodiment, the antireflective coating 32 comprises alternating layers of relatively high and low index of refraction materials. A "high" index of refraction material is any material having a higher index of refraction than that of the "low" index material. In one non-limiting embodiment, the low index of refraction material is a material having an index of refraction of less than or equal to 1.75. Non-limiting examples of such materials include silica, alumina, and mixtures or combinations thereof. The high index of refraction material is a material having an index of refraction of greater than 1.75. Non-limiting examples of such materials include zirconia and zinc stannate. The antireflective coating 32 can be, for example but not limiting to the present invention, a multi-layer coating as shown in FIG. 3 having a first metal alloy oxide layer 86 (first layer), a second metal oxide layer 88 (second layer), a third metal alloy oxide layer 90 (third layer), and a metal oxide top layer 92 (fourth layer). In one non-limiting embodiment, the fourth layer 92 is an upper low index layer comprising silica or alumina or a mixture or combination thereof. The third layer 90 is an upper high index layer comprising zinc stannate or zirconia or mixtures or combinations thereof. The second layer 88 is a bottom low index layer comprising silica or alumina or a mixture or combination thereof. The first layer 86 is a bottom high index layer comprising zinc stannate or zirconia or mixtures or combinations thereof. In one non-limiting embodiment, the top layer 92 comprises silica and ranges from 0.7 to 1.5 quarter wave, e.g., 0.71 to 1.45 quarter wave, such as 0.8 to 1.3 quarter wave, such as 0.9 to 1.1 quarter wave. By "quarter wave" is meant: physical layer thickness·4·refractive index/(reference wavelength of light). In this discussion, the reference wavelength of light is 550 nm. In this non-limiting embodiment, the thickness of the upper high index layer 90 is defined by the formula: $-0.3987 \cdot$ (quarter wave value of top layer)$^2 - 1.1576 \cdot$(quarter wave value of top layer)$+2.7462$. Thus, if the top layer 92 is 0.96 quarter wave, the upper high index layer 90 would be $-0.3987$ $(0.96)^2 - 1.1576$ $(0.96)+2.7462 = 1.2675$ quarter wave. The bottom low index layer 88 is defined by the formula: $2.0567 \cdot$ (quarter wave value of top layer)$^2 - 3.5663 \cdot$(quarter wave value of top layer)$+1.8467$. The bottom high index layer 86 is defined by the formula: $-2.1643 \cdot$(quarter wave value of top layer)$^2 +4.6684 \cdot$(quarter wave value of top layer)$-2.2187$. In one specific non-limiting embodiment, the antireflective coating 32 comprises a top layer 92 of silica of 0.96 quarter wave (88.83 nm), a layer 90 of zinc stannate of 1.2675 quarter wave (84.72 nm), a layer 88 of silica of 0.3184 quarter wave (29.46 nm), and a layer 86 of zinc stannate of 0.2683 quarter wave (17.94 nm). In other non-limiting embodiments, the quarter wave values of the layers 86, 88, and 90 can vary by ±25% from the formula values above, such as ±10%, such as ±5%.

Other suitable antireflective coatings are disclosed in U.S. Pat. No. 6,265,076 at column 2, line 53 to column 3, line 38; and Examples 1-3. Further suitable antireflective coatings are disclosed in U.S. Pat. No. 6,570,709 at column 2, line 64 to column 5, line 22; column 8, lines 12-30; column 10, line 65 to column 11, line 11; column 13, line 7 to column 14, line 46; column 16, lines 35-48; column 19, line 62 to column 21, line 4; Examples 1-13; and Tables 1-8.

In one non-limiting embodiment, the transparency 10 of the invention has a percent reflectance (% R) of visible light in the range of greater than 0% to less than 100%, such as 5% to 85%, such as 10% to 80%, such as 20% to 70%.

The function of the transparency 10 will now be described. Solar energy passes through the first ply 12 and at least some of the solar energy, such as at least a portion of the solar infrared energy, is reflected by the solar control coating 30. Since the first ply 12 is made of a material having a high visible light transmission, most of this reflected energy passes outwardly through the first ply 12 without being absorbed. Since less energy is absorbed by the first ply 12, the first ply 12 does not become as hot and generate heat back into the vehicle as the colored or tinted transparencies of prior transparencies. Also, the use of the solar control coating 30 decreases the amount of solar energy passing to the second ply 18 which also decreases the amount of energy absorbed by the second ply 18 and generated back into the vehicle. Thus, the second ply 18 is cooler than is possible with conventional roof transparencies.

In a further non-limiting embodiment, the color of the second ply 18 can be chosen to be the color compliment of the reflected color of the solar control coating 30. For example, if the solar control coating 30 reflects light in the blue region of the color spectrum, the second ply 18 can be blue glass (or the interlayer 24 can have a blue color) so as to give the transparency 10 an overall neutral color in transmission.

The following Examples illustrate various embodiments of the invention. However, it is to be understood that the invention is not limited to these specific embodiments. In the Examples, "T" refers to the percent transmittance through the article, "R1" refers to the percent reflectance of the article from the side closest to the coating, "R2" refers to the percent reflectance from the side farthest from the coating, "DW" refers to the dominant wavelength (in nanometers), "Pe" refers to the excitation purity. The color coordinates are those of the conventional CIE (1931) and CIELAB systems that will be understood by one of ordinary skill in the art.

EXAMPLES

Example 1

A laminated article was prepared and had the following structure:

| | |
|---|---|
| clear glass | 2.0 mm |
| PVB | 0.75 mm |
| protective overcoat | 1000 Å (85/15 wt. % silica/alumina) |
| zinc stannate | 302.6 Å |
| zinc oxide | 101 Å |
| titanium | 20 Å |
| silver | 118.6 Å |
| zinc oxide | 93.4 Å |
| zinc stannate | 560.0 Å |
| zinc oxide | 93.4 Å |
| titanium | 20 Å |
| silver | 126.4 Å |
| zinc oxide | 103 Å |
| zinc stannate | 618.4 Å |
| zinc oxide | 103 Å |
| titanium | 20 Å |
| silver | 131.2 Å |
| zinc oxide | 100.8 Å |
| zinc stannate | 302.3 Å |
| Starphire ® glass | 2.3 mm |

Figure 4:
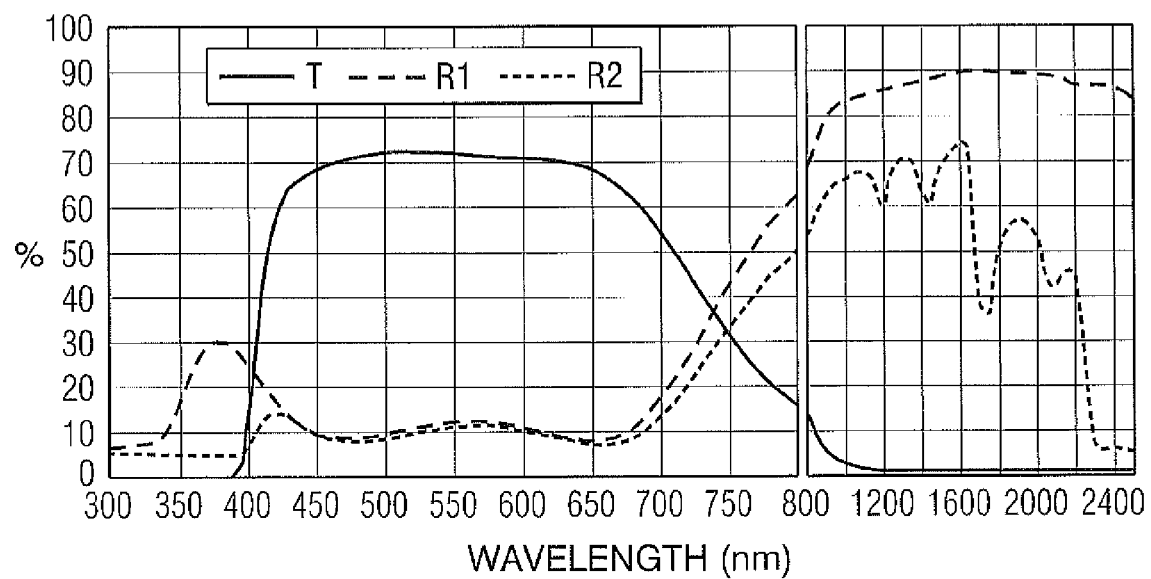
FIG. 4 is a graph of percent transmittance or reflectance versus wavelength for the article of Example 1.

This article was evaluated using several conventional testing methods and had the optical characteristics (transmission and reflection) shown in FIG. 4. The article had the optical characteristics set forth in Tables 1-5 below.

TABLE 1

| (Visible Light (CIE 1931)) | | | |
|---|---|---|---|
| | T | R1 | R2 |
| CIE III, A-2° | 71.56 | 11.31 | 10.41 |
| CIE III, C-2° | 71.79 | 11.37 | 10.41 |
| ASTM 891, 2° | 71.77 | 11.37 | 10.42 |

TABLE 2

| (Solar UV) | | | |
|---|---|---|---|
| | T | R1 | R2 |
| ISO 9050 (280-380T) | 0.02 | 17.62 | 5.01 |
| SAE UV (300-400T) | 1.18 | 22.64 | 5.06 |
| WINDOWS 4 (300-380T) | 0.02 | 20.34 | 4.98 |

TABLE 3

| (Solar IR) | | | |
|---|---|---|---|
| | T | R1 | R2 |
| ASTM 891 (800-2500T) | 2.91 | 82.44 | 59.98 |

TABLE 4

| (Total Solar) | | | |
|---|---|---|---|
| | T | R1 | R2 |
| SAE T(R)sol (E892: 300-2500) | 34.40 | 44.29 | 32.74 |
| WINDOWS 4 T(R)sol (E891: 300-4045) | 31.31 | 48.90 | 35.27 |

TABLE 5

| (Color (CIE 1931)) | | | | | |
|---|---|---|---|---|---|
| | | T | R1 | R2 |
| CIE III, C-2° | DW | 560.45 | 553.73 | 563.82 |
| | Pe | 2.76 | 3.56 | 3.21 |
| | Y | 71.79 | 11.37 | 10.41 |
| | x | 0.3119 | 0.3107 | 0.3130 |
| | y | 0.3247 | 0.3288 | 0.3253 |
| CIE III, D65-2° | Y | 71.82 | 11.38 | 10.40 |
| | x | 0.3146 | 0.3133 | 0.3161 |
| | y | 0.3378 | 0.3419 | 0.3390 |
| CIELAB, D65-10° | L* | 87.84 | 39.99 | 38.33 |
| | a* | −3.04 | −0.91 | 0.33 |
| | b* | 3.88 | 1.18 | 1.05 |
| | C* | 4.92 | 1.49 | 1.10 |
| | h° | 128.08 | 127.47 | 72.49 |

Example 2

Example 2 was the same as Example 1 above except that the PVB layer was replaced by a conventional optical adhesive. The optical adhesive used was Norland Optical Adhesive (No. 61, UV curing). The interlayer was formed by placing the liquid optical adhesive (less than 0.5 cm$^3$) onto the coating and then placing the outer glass ply on the adhesive and curing the adhesive in accordance with the adhesive instructions. The thickness of the cured optical adhesive was not measured.

Figure 5:
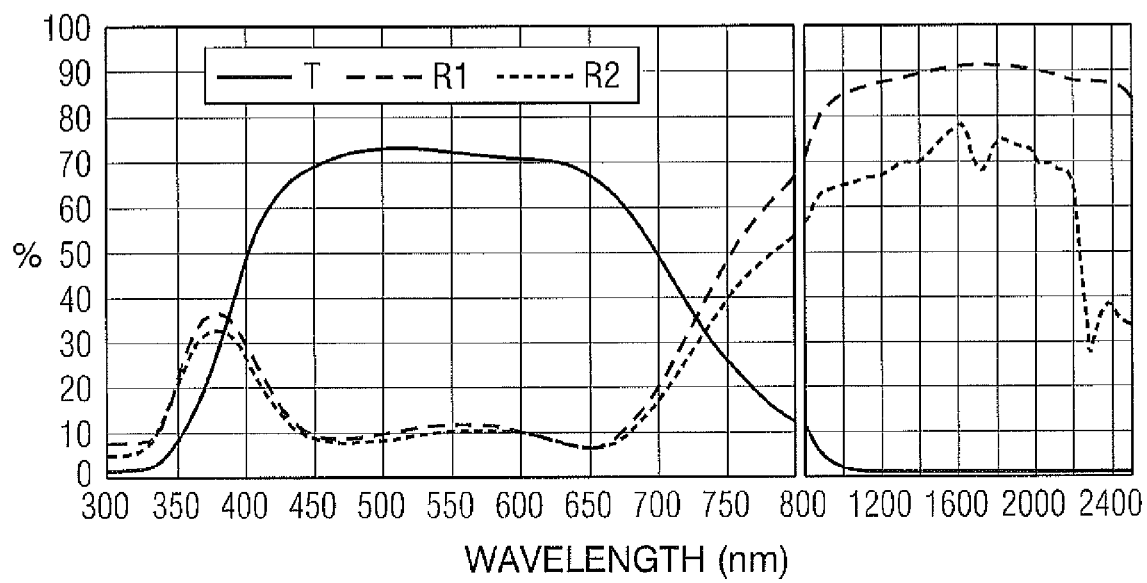
FIG. 5 is a graph of percent transmittance or reflectance versus wavelength for the article of Example 2.

This article had the optical characteristics (transmission and reflection) shown in FIG. 5 and Tables 6-10 below.

TABLE 6

| (Visible Light (CIE 1931)) | | | |
|---|---|---|---|
| | T | R1 | R2 |
| CIE III, A-2° | 71.78 | 10.58 | 9.68 |
| CIE III, C-2° | 72.19 | 10.73 | 9.70 |
| ASTM 891, 2° | 72.14 | 10.71 | 9.70 |

TABLE 7

| (Solar UV) | | | |
|---|---|---|---|
| | T | R1 | R2 |
| ISO 9050 (280-380T) | 9.83 | 21.03 | 18.85 |
| SAE UV (300-400T) | 20.60 | 27.08 | 24.40 |
| WINDOWS 4 (300-380T) | 12.33 | 24.38 | 21.98 |

TABLE 8

| (Solar IR) | | | |
|---|---|---|---|
| | T | R1 | R2 |
| ASTM 891 (800-2500T) | 2.24 | 84.36 | 64.83 |

TABLE 9

| (Total Solar) | | | |
|---|---|---|---|
| | T | R1 | R2 |
| SAE T(R)sol (E892: 300-2500) | 34.83 | 45.64 | 36.13 |
| WINDOWS 4 T (R)sol (E891: 300-4045) | 31.27 | 50.28 | 39.08 |

TABLE 10

| (Color (CIE 1931)) | | | | | |
|---|---|---|---|---|---|
| | | T | R1 | R2 |
| CIE III, C-2° | DW | 550.25 | 497.77 | 516.42 |
| | Pe | 1.90 | 2.71 | 0.53 |
| | Y | 72.19 | 10.73 | 9.70 |
| | x | 0.3100 | 0.3021 | 0.3087 |
| | y | 0.3234 | 0.3208 | 0.3190 |
| CIE III, D65-2° | Y | 72.23 | 10.74 | 9.69 |
| | x | 0.3125 | 0.3046 | 0.3114 |
| | y | 0.3364 | 0.3340 | 0.3317 |
| CIELAB, D65-10° | L* | 88.07 | 38.99 | 37.11 |
| | a* | −3.30 | −1.25 | 0.97 |
| | b* | 2.92 | −1.17 | −1.04 |
| | C* | 4.41 | 1.72 | 1.42 |
| | h° | 138.50 | 223.16 | 312.87 |

Example 3

A computer-generated laminated article was designed using WINFILM software commercially available from FTG Software Associates of Princeton, N.J. The modeled article had the following structure:

| | |
|---|---|
| clear glass | 2.1 mm |
| PVB | 0.76 mm |
| protective overcoat | 40 Å (titania) |
| zinc stannate | 246.3 Å |
| zinc oxide | 80 Å |
| titanium | 20 Å |
| silver | 80.3 Å |
| zinc oxide | 80 Å |
| zinc stannate | 548.2 Å |
| zinc oxide | 80 Å |
| titanium | 20 Å |
| silver | 105.7 Å |
| zinc oxide | 80 Å |
| zinc stannate | 585.8 Å |
| zinc oxide | 80 Å |
| titanium | 20 Å |
| silver | 97.2 Å |
| zinc oxide | 80 Å |
| zinc stannate | 307.2 Å |
| Starphire ® glass | 2.1 mm |

This article had an LTA of 76.1% and the following optical characteristics:

| | L* | a* | b* |
|---|---|---|---|
| CIELAB D65, 10° | 34.3 | −2.2 | −1.3 |
| CIELAB D65, 60° | 45.3 | −0.14 | −0.08 |

Example 4

A laminated article was prepared and had the following structure:

| | |
|---|---|
| GL-20 ® glass | 2.0 mm |
| optical adhesive | Norland Optical Adhesive (No. 61) |
| protective overcoat | 1000 Å (85/15 wt. % silica/alumina) |
| zinc stannate | 213.3 Å |
| zinc oxide | 80 Å |
| titanium | 13 Å |
| silver | 117.8 Å |
| zinc oxide | 80 Å |
| zinc stannate | 537.1 Å |
| zinc oxide | 80 Å |
| titanium | 13 Å |
| silver | 139 Å |
| zinc oxide | 80 Å |
| zinc stannate | 669.9 Å |
| zinc oxide | 80 Å |
| titanium | 13 Å |
| silver | 203.2 Å |
| zinc oxide | 80 Å |
| zinc stannate | 251.7 Å |
| Starphire ® glass | 2.3 mm |

Figure 6:
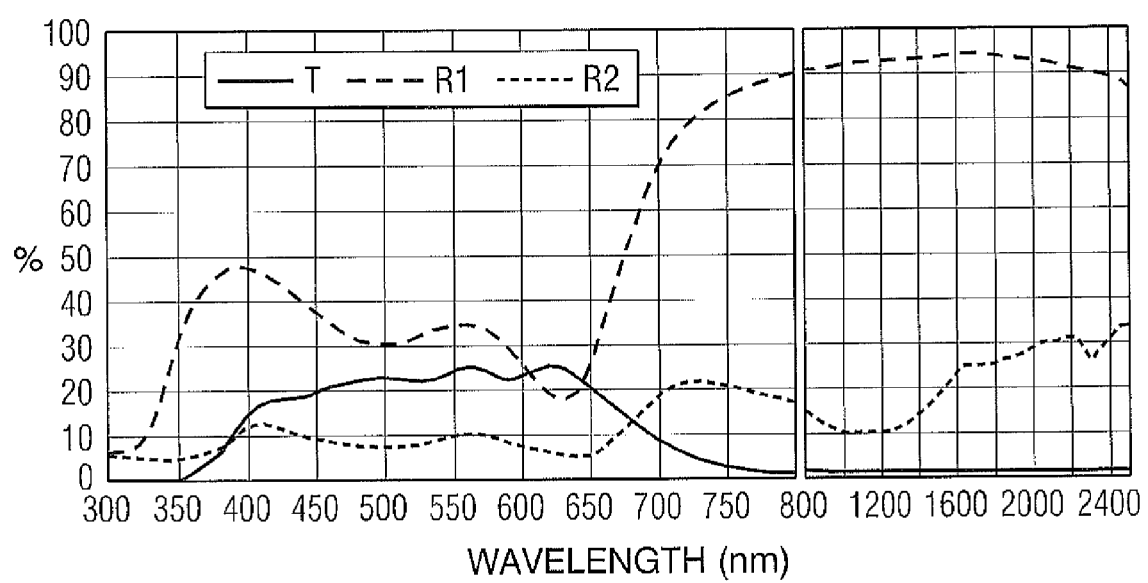
FIG. 6 is a graph of percent transmittance or reflectance versus wavelength for the article of Example 4.

This article was evaluated using several conventional testing methods and had the optical characteristics (transmission and reflection) shown in FIG. 6. The article had the optical characteristics set forth in Tables 11-15 below.

TABLE 11

(Visible Light (CIE 1931))

| | T | R1 | R2 |
|---|---|---|---|
| CIE III, A-2° | 23.21 | 29.89 | 8.22 |
| CIE III, C-2° | 23.15 | 30.90 | 8.38 |
| ASTM 891, 2° | 23.18 | 30.65 | 8.33 |

TABLE 12

(Solar UV)

| | T | R1 | R2 |
|---|---|---|---|
| ISO 9050 (280-380T) | 1.47 | 27.32 | 5.18 |
| SAE UV (300-400T) | 4.87 | 36.19 | 6.62 |
| WINDOWS 4 (300-380T) | 2.01 | 31.57 | 5.35 |

TABLE 13

(Solar IR)

| | T | R1 | R2 |
|---|---|---|---|
| ASTM 891 (800-2500T) | 0.10 | 91.86 | 15.31 |

TABLE 14

(Total Solar)

| | T | R1 | R2 |
|---|---|---|---|
| SAE T(R)sol (E892: 300-2500) | 9.63 | 63.15 | 12.42 |
| WINDOWS 4 T(R)sol (E891: 300-4045) | 8.55 | 66.90 | 13.25 |

TABLE 15

(Color (CIE 1931))

| | | T | R1 | R2 |
|---|---|---|---|---|
| CIE III, C-2° | DW | 570.06 | 482.97 | 487.53 |
| | Pe | 8.26 | 12.03 | 5.75 |
| | Y | 23.15 | 30.90 | 8.38 |
| | x | 0.3212 | 0.2822 | 0.2955 |
| | y | 0.3360 | 0.2987 | 0.3122 |
| CIE III, D65-2° | Y | 23.13 | 30.89 | 8.36 |
| | x | 0.3237 | 0.2847 | 0.2983 |
| | y | 0.3482 | 0.3127 | 0.3255 |
| CIELAB, D65-10° | L* | 55.08 | 62.48 | 34.60 |
| | a* | −1.75 | −3.58 | −1.10 |
| | b* | 5.94 | −8.40 | −2.53 |
| | C* | 6.19 | 9.13 | 2.76 |
| | h° | 106.39 | 246.89 | 246.45 |

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A transparency, comprising:
 a first ply having a first visible light transmission, said first ply having a No. 1 surface and a No. 2 surface, and said first ply being an outboard ply;
 a second ply having a second visible light transmission, with the first visible light transmission being greater than the second visible light transmission, said second ply having a No. 3 surface and a No. 4 surface, said No. 2 surface facing said No. 3 surface, and said second ply being an inner ply; and
 a solar control coating formed over at least a portion of said No. 2 surface, wherein the solar control coating has a first infrared reflective metallic layer, a second infrared reflective metallic layer and a third infrared reflective metallic layer, said first infrared reflective metallic layer formed over said No. 2 surface, said second infrared reflective metallic layer formed over said first infrared reflective metallic layer, and said third infrared reflective metallic layer formed over said second infrared reflective metallic layer; and wherein the first infrared reflective metallic layer is thicker than the second infrared reflective metallic layer and the second infrared reflective metallic layer is thicker than the third infrared reflective metallic layer.

2. The transparency of claim 1, wherein the first ply and the second ply comprise glass.

3. The transparency of claim 1, wherein the first ply has a visible light transmission of at least 87% at a reference wavelength of 550 nm.

4. The transparency of claim 1, wherein the infrared reflective metallic layers comprise metallic silver.

5. The transparency of claim 4, wherein the first silver layer has a thickness in the range of 90 Å to 205 Å, the second silver layer has a thickness in the range of 100 Å to 140 Å, and the third silver layer has a thickness in the range of 80 Å to 120 Å.

6. The transparency of claim 1, further including an antireflective coating over at least a portion of the second ply.

7. The transparency of claim 6, wherein the antireflective coating is a multi-layer coating comprising at least one layer comprising a material having an index of refraction of less than or equal to 1.75 and at least one layer comprising a material having an index of refraction of greater than 1.75.

8. The transparency of claim 7, wherein said antireflective coating is provided over at least a portion of the No. 4 surface of the second ply.

9. The transparency of claim 1, wherein the first and second plies comprise annealed glass.

10. A vehicle transparency, comprising:
a first glass substrate having a visible light transmission of at least 87%, said first glass substrate having a No. 1 surface and a No. 2 surface, and said first glass substrate being an outboard glass substrate;
a functional coating provided over at least a portion of said No. 2 surface of the first glass substrate, the functional coating comprising, in the following sequence:
a zinc stannate layer having a thickness in the range of 250 Å to 310 Å, formed over said No. 2 surface;
a zinc oxide layer having a thickness in the range of 80 Å to 105 Å;
a first silver layer having a thickness in the range of 90 Å to 205 Å;
a zinc oxide layer having a thickness in the range of 80 Å to 110 Å;
a zinc stannate layer having a thickness in the range of 585 Å to 680 Å;
a zinc oxide layer having a thickness in the range of 80 Å to 110 Å;
a second silver layer having a thickness in the range of 100 Å to 140 Å;
a zinc oxide layer having a thickness in the range of 80 Å to 100 Å;
a zinc stannate layer having a thickness in the range of 530 Å to 565 Å;
a zinc oxide layer having a thickness in the range of 80 Å to 105 Å;
a third silver layer having a thickness in the range of 80 Å to 120 Å;
a zinc oxide layer having a thickness in the range of 80 Å to 105 Å; and
a zinc stannate layer having a thickness in the range of 210 Å to 305 Å,
wherein the first silver layer is thicker than the second silver layer and the second silver layer is thicker than the third silver layer; and
a second glass substrate having a visible light transmission less than that of the first glass substrate, said second glass substrate having a No. 3 surface and a No. 4 surface, said No. 2 surface facing said No. 3 surface, and said second glass substrate being an inner glass substrate.

11. The transparency of claim 10, further including an antireflective coating over at least a portion of the No. 4 surface.

12. The transparency of claim 11, wherein the antireflective coating is a multi-layer coating comprising at least one layer comprising a material having an index of refraction of less than or equal to 1.75 and at least one layer comprising a material having an index of refraction of greater than 1.75.

* * * * *